June 30, 1964    H. R. EDWARDS    3,138,859
METHOD OF ASSEMBLING CABLING IN INFLATABLE SEAMLESS TUBING
Filed Jan. 3, 1961

INVENTOR.
H. ROBERT EDWARDS
BY
ATTORNEY 3,138,859
METHOD OF ASSEMBLING CABLING IN
INFLATABLE SEAMLESS TUBING
Hugh Robert Edwards, Corona del Mar, Calif., assignor
to Walter A. Plummer, Sherman Oaks, Calif.
Filed Jan. 3, 1961, Ser. No. 80,148
4 Claims. (Cl. 29—450)

The present invention relates to a method of utilizing an improved restrictor jacket assembly in connection with the jacketing of cabling with expandable type seamless tubing.

It is common practice to enclose relatively short lengths of cabling with expandable seamless tubing to provide a protective insulating cover therefor. Such custom tailored cabling is used in large quantities to interconnect spaced-apart assemblies of electrical components in a great variety of installations including aircraft, missiles and electronic gear generally. For convenience and economy, most such cabling is custom made at the point of assembly in order that it may include the requisite size, type and number of wires required for a particular installation. Once the cabling core has been assembled it is highly desirable that it be enclosed by a protective casing for the purpose of holding the wires snugly compacted, to protect and to insulate the assembly.

One of the commonly practiced modes comprises utilizing expandable seamless tubing formed from a stretchable plastic or rubber composition. Since it is desirable that the jacketing be of a size to embrace snugly the particular cabling sought to be protected a serious problem is presented in the assembly of this jacketing over the bundle of wires making up the cable. The most expeditious technique involves inserting an air supply plug in one end of the tubing and assembling the other end over one end of the compactly bundled wires. The admission of pressurized air to the jacketing via the plug serves to expand the tubing sufficiently to enable the cable core to be telescoped into the expanded tubing as portions of the pressurized air escapes through the open end of the expanded tubing.

One of the serious problems encountered is that the tubing tends to have areas of weakness in its walls with the result that these areas tend to expand or "balloon." This ballooning tendency further weakens such areas of the tubing causing it to expand still further until failure occurs. The entire section of tubing is then worthless and usually must be destroyed to effect its removal from the cabling.

The present invention provides a method of utilizing simple restrictor jacket to safeguard against unequal expansion and ballooning of seamless tubing during assembly. The restrictor jacket is made from high-strength, flexible material and is provided longitudinally thereof with a considerable number of fastening devices pairs of which may be selectively assembled as necessary to provide a restrictor jacket of the diameter required for use with a particular diameter of seamless tube to be telescoped over a cable core. The restrictor jacket is assembled about a length of the seamless tubing prior to the assembly of the latter about a length of cabling and positively limits the expansion of the tubing to a size adequate to expedite assembly of the tubing over the cable core. Once the assembly operation has been accomplished the particular pair of fasteners in use are opened permitting the jacket to be removed and reused repeatedly in subsequent seamless tubing assembly operations.

Accordingly, a primary object of the present invention is the provision of an improved technique for use in the assembly of stretchable seamless tubing over cabling, conduits and the like.

Another object of the invention is the provision of a method of using a restrictor jacket having a plurality of pairs of separable fasteners arranged lengthwise thereof and by which the jacket can be selectively assembled into a tube of a desired size for use in the assembly of different sizes of seamless tubing over a structure to be enclosed thereby.

Another object is the provision of a method of using an accessory in the expeditious assembly of expandable seamless tubing telescopically over an assembly desired to be encased thereby and effective in safeguarding against rupture of the seamless tubing during the assembly operation by reason of the air pressure employed to expand the tube or mechanical rupture of the tubing from forces acting from within or from without the tubing.

These and other more specific objects will appear upon reading the following specification and claims and upon considering in connection therewith the attached drawing to which they relate.

Referring now to the drawing in which a preferred embodiment of the invention is illustrated.

Figure 1:
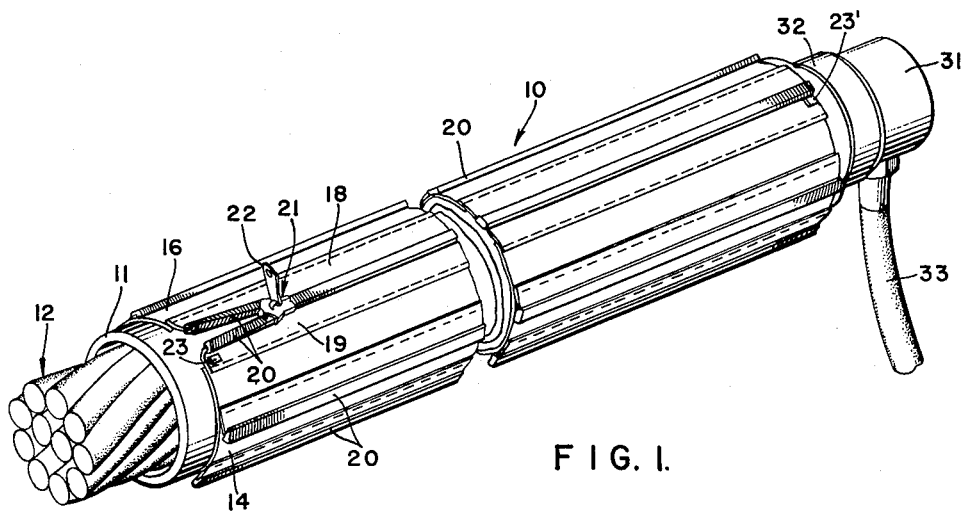
FIGURE 1 is a general perspective view showing the restrictor jacket assembly of this invention in use.

Referring now to the drawing, there is shown one preferred embodiment of a restrictor jacket designated generally 10 incorporating the features of the invention. This jacketing is shown assembled about expandable seamless tubing 11 in the process of being telescoped over a bundle of wires or a cable core 12.

Restrictor jacket 10 comprises a main body layer 14 of suitable high-strength, flexible material, as for example, canvas, fiberglass, reinforced plastic or rubberized material or the like suitable for repeated use under the harsh and abusive operating conditions normally encountered in jacketing operations. Main body 14 is formed in a strip of a length required for the longest length of seamless tubing 11 likely to be encountered in the use of the restrictor jacket. The protrusion of the jacket beyond one end of seamless tubing 11 ordinarily presents no difficulty, any excess jacketing material being left open and folded back over the closed portion or rolled into compact form. The main body of the jacket is provided with suitable means for holding the same closed in sizes of different diameters and preferably comprising a plurality of strips of hookless fasteners arranged in parallel rows lengthwise of the exterior side of the jacketing. As here shown, the opposite lateral edges 16 and 17 of the main body are provided with any suitable type of interlocking slide fastener tapes 18 and 19 each having teeth 20 designed to interlock in known manner to form a high-strength, flexible seam when closed by the aid of a closure device 21 arranged to embrace teeth 20 of a selected pair of tapes. Slide device 21 is normally provided with a pull tab 22 by the aid of which the slide device may be pulled in one direction or the other depending upon whether the seam is to be closed or opened. Preferably, the opposite ends of tape 19 are provided with abutments or stops 23, 24 which function to prevent slider 21 from being withdrawn from either end of tape 19.

Figure 3:
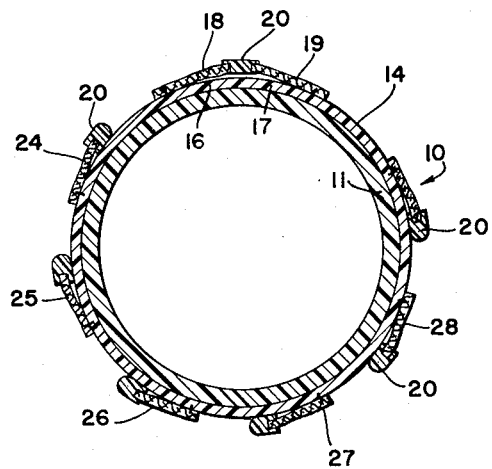
FIGURE 3 is a transverse sectional view on an enlarged scale taken along line 3—3 on FIGURE 2.

As is made clear by FIGURE 3, restrictor jacket 10 is provided at circumferentially spaced intervals with other slide fastener tapes 24 through 28 parallel to master tape strip 19 and each having teeth or hooks 20 mateable with juxtaposed hooks of tape 19 to provide a restrictor jacket of any desired smaller size than that formed when strips 18 and 19 are interjoined. In this connection it is pointed out that slider 21 is disengaged from one end of tape 18 and assemblable over the right-hand ends of the hooks on any one of the other tapes in order that they may interlock with the teeth 20 of the tape 19 to form a seam.

In use, an expandable seamless tube 11 of a selected size desired to be assembled over a cable of wires 12 is first assembled over the rounded pilot end 30 of a plug 31. Once so assembled, tubing 11 is held in place on the plug as by a hose clamp 32 having any suitable closure device. Plug 31 is formed with an air inlet passage 33 connected at its outer supply end to a flexible hose 34 leading to a supply of pressurized air.

Figure 2:
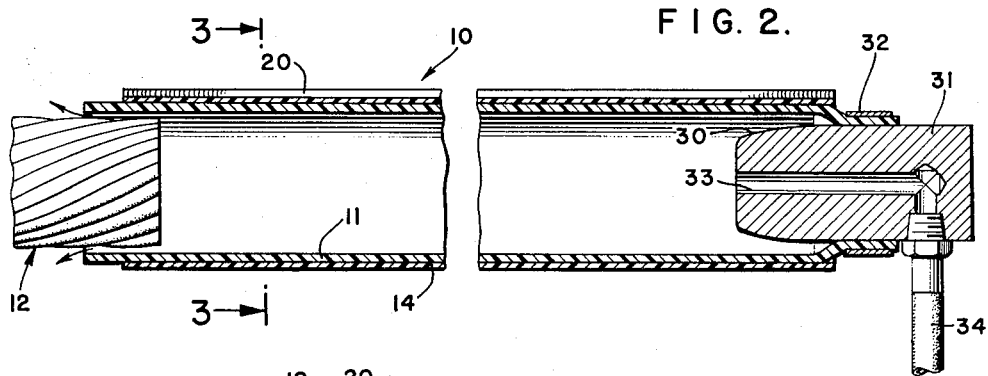
FIGURE 2 is a longitudinal sectional view through FIGURE 1.

The next step is to place cable core 12 within the open end of tubing 11. If restrictor jacket 10 is longer than the particular length of seamless tubing 11, the excess length of the jacket protrudes beyond the left-hand end of the tubing as illustrated in FIGURE 2, or is merely folded back in open condition over closed portions of the jacketing. Slide fastener tape 19 is then mated with the particular one of the remaining tapes as necessary to provide a jacket of the desired diameter relative to the cabling core to be jacketed. Once this is accomplished and the seam is closed by the aid of slider 21 and its pull tab 22, air is admitted through hose 34 and passage 33 into the seamless tubing inflating the latter against the inner surface of restrictor jacket 10. As this occurs, the open end of the tubing expands away from cabling core 12 allowing a certain amount of the air to escape. Since the supply is considerably greater than that escaping, tubing 11 remains fully expanded against the restrictor jacket 10. This permits the operator to insert the cabling easily and quickly into tubing 11 as air continues to escape around the outer periphery of the cable core. No attention need be given to the amount of air being wasted to the atmosphere nor is there any danger of excess air causing failure of the tubing since it is protected against over-expansion by the confining effect of jacketing 10.

Once the jacket has been placed about the cable core, the air is turned off and plug 31 as well as jacketing 10 is removed preparatory to reuse in the assembly of other lengths of seamless tubing to the cable core.

While the particular restrictor jacket herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. That improvement in the assembly of inflatable seamless tubing over cabling which comprises, placing inflatable seamless tubing in a surrounding tubular restrictor jacket substantially co-extensive in length with said seamless tubing and readily adjustable in size to accommodate the particular size of seamless tubing to be inflated for assembly over cabling, adjusting the size of said restrictor jacket to accommodate the selected size of inflatable tubing being assembled to cabling, inflating said tubing by introducing pressurized air into one end of said tubing while restricting the outflow at the opposite end thereof sufficiently to maintain said tubing inflated against the inner surface of said tubular restrictor jacket and continuing to hold said tubing inflated while inserting a length of cabling axially into the opposite end, deflating said tubing against the cabling, and removing said tubular restrictor jacket from the assembled cabling and seamless tubing.

2. That improvement defined in claim 1 characterized in that said tubular restrictor jacket is formed of flexible material and includes a plurality readily opened and closed longitudinal seam forming strips spaced circumferentially thereof and at least one of which can be interlocked with any selected one of the remaining strips to form a seam holding said jacket closed in cross-sectional size dependent on the strip selected to mate with said one strip.

3. That improved method of assembling cabling within a seamless inflatable tubing while protecting said tubing against rupture and excecessive inflation, said method comprising providing a strip of flexible material substantially co-extensive in length with said seamless tubing and having provision for selectively closing the same to form a tubular jacket having any one of several different predetermined diameters, closing said strip about the exterior of said seamless tubing to a selected one of said several predetermined diameters while leaving predetermined room for expansion of the particular size of tubing to be inflated, placing one end of said tubing opposite one end of cabling to be inserted therethrough, introducing pressurized air to the second end of said tubing while restricting the escape thereof from said one end sufficiently to inflate the same to a size readily receiving said cabling, continuing to hold said tubing inflated while inserting cabling into said one end until the assembly of the tubing over the cabling is complete, and then removing said strip for reuse in assembling other sections of seamless tubing and cabling.

4. That method of jacketing lengths of cabling of a range of diameter with inflatable seamless tubing of a size snugly fitting any selected size of cabling to be jacketed, said method comprising selecting seamless tubing of the requisite cross-sectional size and coextensive in length with cable to be snugly jacketed therewithin, wrapping the tubing with a longitudinally-seamed restrictor jacket having a multiple rows of slide fastener tapes secured lengthwise thereof and selectably mateable to form a tubular restrictor jacket of an appropriate diameter for use in assembling the said selected cable into snug fitting seamless tubing, mating a selected pair of said multiple rows of tapes to provide a tubular restrictor jacket of a size appropriate to protect a selected size of seamless tubing, pressurizing said tubing from one end with pressurized air to inflate said inflatable tubing to the extent permitted by said restrictor jacket while assembling the other end of the inflated tubing endwise over said selected cabling to be jacketed, and thereafter discontinuing the inflation of said seamless tubing and removing said restrictor jacket from over said seamless tubing on said cabling.

References Cited in the file of this patent

UNITED STATES PATENTS

| | | |
|---|---|---|
| 1,733,610 | Leipert | Oct. 29, 1929 |
| 1,879,410 | Morris et al. | Sept. 27, 1932 |
| 2,371,042 | Fogg | Mar. 6, 1945 |
| 2,645,004 | Dorner | July 14, 1953 |
| 2,871,553 | Binder | Feb. 3, 1959 |
| 2,937,664 | Plummer | May 24, 1960 |